(12) United States Patent
Bhatia et al.

(10) Patent No.: US 9,361,052 B2
(45) Date of Patent: Jun. 7, 2016

(54) MANAGING NETWORK CONNECTIONS (71) Applicant: Hewlett-Packard Development Company, L.P., Houston, TX (US)

(72) Inventors: Rajesh Bhatia, Bangalore (IN); Harish B. Kamath, Bengalooru (IN)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 14/715,211

(22) Filed: May 18, 2015

(65) Prior Publication Data
US 2015/0248261 A1 Sep. 3, 2015

Related U.S. Application Data (63) Continuation of application No. 13/247,158, filed on Sep. 28, 2011, now Pat. No. 9,036,185.

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04N 1/327* | (2006.01) | |
| *H04L 29/08* | (2006.01) | |
| *H04L 29/06* | (2006.01) | |

(52) U.S. Cl.
CPC ............ *G06F 3/1236* (2013.01); *G06F 3/122* (2013.01); *G06F 3/1221* (2013.01); *G06F 3/1222* (2013.01); *G06F 3/1229* (2013.01); *G06F 3/1287* (2013.01); *G06F 3/1288* (2013.01); *H04L 67/14* (2013.01); *H04L 69/18* (2013.01); *H04N 1/00233* (2013.01); *H04N 1/32771* (2013.01); *H04N 1/00307* (2013.01); *H04N 2201/0036* (2013.01); *H04N 2201/0055* (2013.01); *Y02B 60/1271* (2013.01)

(58) Field of Classification Search
USPC .................................................. 358/1.1–1.18
See application file for complete search history.

(56) References Cited

U.S. PATENT DOCUMENTS

| | | |
|---|---|---|
| 6,564,337 B1 | 5/2003 | Yoneda et al. |
| 6,757,741 B1 | 6/2004 | Hertling |
| 7,111,060 B2 | 9/2006 | Araujo et al. |
| 7,386,738 B2 | 6/2008 | Trappeniers et al. |

(Continued)

FOREIGN PATENT DOCUMENTS

| | | |
|---|---|---|
| CN | 1638333 A | 7/2005 |
| CN | 101677319 A | 3/2010 |

(Continued)

OTHER PUBLICATIONS

U.S. Appl. No. 13/749,341, filed Jul. 24, 2014, Pizot et al.

(Continued)

*Primary Examiner* — Douglas Tran
(74) *Attorney, Agent, or Firm* — HP Inc. Patent Department (57) ABSTRACT

A remote server and network connectable printer arrangement is provided. The remote server can send a job availability message via a first communication protocol to the network connectable printer to cause the network connectable printer to establish a network connection. The remote server may then send a print job to the network connectable printer over the network. The network connectable printer may then print the print job and then terminate the connection thereafter.

18 Claims, 7 Drawing Sheets

(56) References Cited

U.S. PATENT DOCUMENTS

| | | | |
|---|---|---|---|
| 7,730,339 B2 | 6/2010 | Wang | |
| 7,870,044 B2 | 1/2011 | Robertson | |
| 8,019,829 B2 | 9/2011 | Cocotis et al. | |
| 8,223,355 B2 | 7/2012 | McCoog et al. | |
| 8,363,247 B2 | 1/2013 | Butcher | |
| 8,570,567 B2* | 10/2013 | Siddle | 358/1.15 |
| 9,036,185 B2* | 5/2015 | Bhatia et al. | 358/1.15 |
| 2001/0029531 A1 | 10/2001 | Ohta | |
| 2002/0046238 A1 | 4/2002 | Estavillo et al. | |
| 2002/0103853 A1 | 8/2002 | Copp et al. | |
| 2002/0131082 A1 | 9/2002 | Al-Varez-Baron Stoof | |
| 2002/0181010 A1 | 12/2002 | Pineau | |
| 2003/0078965 A1 | 4/2003 | Cocotis et al. | |
| 2004/0185882 A1 | 9/2004 | Gecht et al. | |
| 2005/0052694 A1 | 3/2005 | Asano | |
| 2005/0105127 A1 | 5/2005 | Miwa et al. | |
| 2005/0162685 A1 | 7/2005 | Heiles et al. | |
| 2005/0219612 A1 | 10/2005 | Nakagawa | |
| 2005/0273496 A1 | 12/2005 | Jean et al. | |
| 2006/0176504 A1 | 8/2006 | Burke et al. | |
| 2006/0250642 A1 | 11/2006 | Trappe et al. | |
| 2007/0016680 A1 | 1/2007 | Burd et al. | |
| 2007/0268518 A1 | 11/2007 | Yokoyama | |
| 2009/0011708 A1 | 1/2009 | Kim et al. | |
| 2010/0211698 A1 | 8/2010 | Krishnaswamy | |
| 2010/0274848 A1 | 10/2010 | Altmaier et al. | |
| 2011/0022812 A1 | 1/2011 | van der Linden et al. | |
| 2011/0173324 A1 | 7/2011 | Wang et al. | |
| 2011/0235508 A1 | 9/2011 | Goel et al. | |
| 2012/0188600 A1 | 7/2012 | Oshima et al. | |
| 2012/0194864 A1 | 8/2012 | Oshima et al. | |
| 2012/0300251 A1 | 11/2012 | St. Laurent et al. | |
| 2013/0010333 A1 | 1/2013 | Anand et al. | |
| 2013/0060942 A1 | 3/2013 | Ansari et al. | |
| 2013/0060950 A1 | 3/2013 | Furuta et al. | |
| 2013/0077127 A1 | 3/2013 | Bhatia et al. | |
| 2013/0077129 A1 | 3/2013 | Soh et al. | |
| 2013/0103844 A1 | 4/2013 | Bulut et al. | |
| 2013/0111038 A1 | 5/2013 | Girard | |
| 2013/0286416 A1 | 10/2013 | Saurabh | |

FOREIGN PATENT DOCUMENTS

| | | |
|---|---|---|
| JP | 2007048031 A | 2/2007 |
| WO | WO-2010031310 A1 | 3/2010 |

OTHER PUBLICATIONS

Audet, Francois, and Cullen Jennings, "Network Address Translation (NAT) Behavioral Requirements for Unicast UDP," Network Working Group, RFC 4787, Jan. 2007.

Breuer, S. et al., UniFLOW, (Research Paper), Sep. 15, 2010, http://www.nt-ware.com/mom/5.0/eng/momuserdoc_en.pdf.

Caituiro-Monge, H. et al., "Friend Relay: a Resource Sharing Framework for Mobile Wireless Devices," (Research Paper), Publication Date: 2006; on pp. 20-29; found at http://nmsl.cs.ucsb.edu/papers/142.pdf.

Calderone et al., "[Twisted-web] Implementing hanging get with twisted web," (Webpage), Nov. 11, 2006, <http://twistedmatrix.com/pipermail/twisted-web/2006-November/003140.html>.

Der-Chen Huang, "A low cost transparent traversal method for NAT," 2011 7th International Wireless Communications and Mobile Computing Conference (IWCMC), Jul. 4-8, 2011, pp. 671-676.

Extended European Search Report received in EP case 10849584.7, Feb. 21, 2014, 5 pages.

Fielding et al., "Principled Design of the Modern Web Architecture," ACM Transactions on Internet Technology, vol. 2, No. 2, May 2002, pp. 115-150, <http://www.ics.uci.edu/~taylor/documents/2002-REST-TOIT.pdf>.

Ford, Bryan, Pyda Srisuresh, and Dan Kegel, "Peer-to-Peer Communication Across Network Address Translators," USENIX Annual Technical Conference, General Track. 2005, found at http://www.bford.info/pub/net/p2pnat/index.html#sec-hairpin.

International Preiiminary Report on Patentability received in PCT Application No. PCT/US2010/030220, Oct. 9, 2012, 6 pages.

International Search Report received in PCT Application No. PCT/US2010/030220, Dec. 10, 2010, 3 pages.

Internet Architecture Board, "IAB Considerations for UNilateral Self-Address Fixing (UNSAF) Across Network Address Translation," Network Working Group, RFC 3424, Nov. 2002, <http://tools.ietf.org/html/rfc3424>.

K. Egevang, "The IP Network Address Translator (NAT) RFC 1631," IETF Network Working Group, May 1994.

Muller, A., Carle, G. and Klenk, A., "Behavior and Classification of NAT Devices and Implications for NAT Traversal," IEEE Network Special Issue on Implications and Control of Middleboxes, Oct. 2008.

Rob Mead, "HP invents printing for your mobile." TechRadar, Aug. 19, 2007, <http://www.techradar.com/us/news/phone-and-communications/mobile-phones/computing-components/peripherals/hp-invents-printing.

Rosenberg et al., "Session Traversal Utilities for NAT (STUN)," Network Working Group, RFC 5389, Oct. 2008, <http://tools.ietf.org/html/rfc5387>.

Rosenberg et al., "STUN—Simple Traversal of User Datagram Protocol (UDP) Through Network Address Translators (NATs)," Network Working Group, RFC 3489, Mar. 2003, <http://tools.ietf.org/html/rfc3489>.

Sarah Perez, "HP's CloudPrint Coming to BlackBerry," ReadWrite, May 4, 2009, <http://readwrite.com/2009/05/04/hps_cloudprint_coming_to_blackberry>.

Srisuresh et al., "Traditional IP Network Address Translator (Traditional NAT)," Network Working Group, RFC 3022, Jan. 2011, <http://tools.ietf.org/pdf/rfc3022.pdf>.

Wang, Yong, "Man-in-the-middle Attack on BB84 Protocol and its Defense," 2009 2nd IEEE International Conference on Computer Science and Information Technology, 2009, pp. 438-439.

Wikipedia, "XMPP," XP002720778, Mar. 27, 2010, pp. 1-7. Retrieved from the Internet: http://en.wikipedia.org/w/index.php?title=XMPP&oldid=352338507.

Wikipedia, "Polling (computer science)," Mar. 12, 2010, <http://web.archive.org/web/20100312231959/http://en.wikipedia.org/wiki/Polling_(computer_science)>.

XMPP Standards Foundation, "XMPP Technologies: Overview," Dec. 16, 2009, <http://web.archive.org/web/20091216030050/http://xmpp.org/tech/overview.shtml>.

Yan, M. et al. "A New Method for Accessing Documents in Environments with Limited Connection Speed, Storage and Screen Space," (Research Paper), Publication Date: 2002; vol. 1; on pp. 273-276; found at http://ieeexplore.ieee.org/Xplore/login.jsp?.

* cited by examiner

MANAGING NETWORK CONNECTIONS

CROSS-REFERENCE TO RELATED APPLICATION

This application is a Continuation of U.S. patent application Ser. No. 13/247,158, filed Sep. 28, 2011, entitled "MANAGING NETWORK CONNECTIONS", issued as U.S. Pat. No. 9,036,185 on May 19, 2015, which is hereby incorporated by reference in its entirety.

BACKGROUND

Certain network-connectable printers are capable of sending and receiving communications and printable content via the Internet without being connected to a desktop computer, laptop computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Internet-connectable printers are frequently configured to have an "always-on" connection to a remote server or server system via the internet, e.g., over a Transmission Control Protocol ("TCP") based or Extensible Messaging and Presence Protocol ("XMPP") based connection. The printer establishes an internet connection on printer boot and may retain the connection with the remote server system through the operating lifetime of the printer.

While the "always on" connection has the attribute of an established connection to the remote server system, such a connection consumes network bandwidth even at times the printer is inactive. From a server system perspective, these bandwidth costs can significantly impact scalability as the server system may be simultaneously connected with millions of network-connectable printers. From the perspective of the network-connectable printer, another disadvantage of the "always on" printer is that it will draw more power to maintain an active state, and thus may be more expensive to operate, than a standalone printer that is routinely turned off between print jobs. Further, an "always on" network-connected printer can be more susceptible to security attacks than a printer that is turned off between print jobs.

Accordingly, various embodiments described herein were developed in an effort to allow internet-connectable printers to connect to the internet when a print job arrives at the remote server for printing at the printer. It should be noted that while the disclosure is discussed frequently with reference to internet-connectable printers, the teachings of the present disclosure are not so limited and can be applied to any network-connectable printer. According to embodiments described herein, a message is received at a network-connectable printer, from a first computer system, via a first communication protocol. In response to receipt of the message, a connection is established via a second communication protocol between the printer and the network. A print job is received at the printer via the connection, and is caused to print at the printer. After the print job is printed, the connection is terminated. By limiting network connectivity in this manner, the printer is protected from security threats and, consumes less power, and the remote server system frees up bandwidth, as compared to systems that have printers connected to the network via an "always on" architecture.

As used herein, a "network-connectable printer" refers to a printer that can be connected to a network, to be capable of obtaining content, sending and receiving messages, accessing network content, and/or accessing applications via a network. In examples, the network may be a proprietary network, a secured network, an open network, an intranet, an extranet, an internet or the Internet. "Printer" or "printing device" refers to any electronic device that prints and includes multifunctional electronic devices that perform additional functions such as scanning and/or copying. An "instant message" refers to a message sent via a real-time text or other messaging system.

Figure 1:
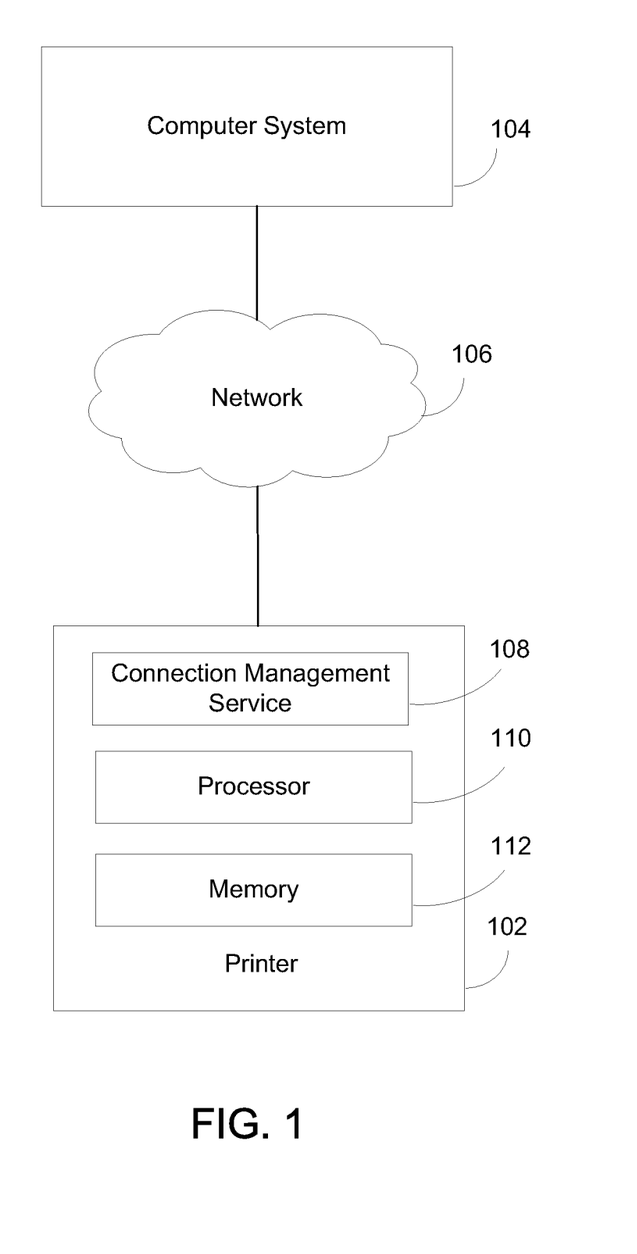
FIGS. 1-6 are block diagrams illustrating systems according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc., may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows a printer 102 and computer system 104 connected to a network 106. Printer 102 represents generally a computing device that is operable to produce printed output and to send and receive communications and content to each other over the network 106. Computer system 104 represents generally any computing device or group of computing devices capable of sending network requests and content to, and otherwise communicating with printer 102. In embodiments, computer system 104 may be or include a server, desktop computer, laptop computer, mobile computing device, tablet computer, and/or any other computing device.

Computing device 104 includes a connection management service 108. Connection management service 108 represents generally any combination of hardware and programming configured to manage connections between a printer and a network in order that the printer can receive print jobs. In one example, a connection management service 108 at printer 102 receives a message from computer system 104 via a first communication protocol that is temporary and/or requires less printer 102 and computer system 104 processing resources as compared to the protocol by which the printer 102 receives print jobs. In an example, the first protocol may be a Short Message Service ("SMS") protocol or other text messaging protocol. The received message instructs printer 102 to establish a connection between printer 102 and network 106 via a second communication protocol, e.g., XMPP protocol or a TCP based Session Initiation Protocol ("SIP") protocol. In response to receipt of the message, connection management service 108 establishes the connection. After establishment of the connection, connection management service 108 receives a print job via the connection, and causes the print job to print at printer 102. After printing of the print job, connection management service 108 terminates the connection.

The functions and operations described with respect to computer system 102 may be implemented as a computer-readable storage medium containing instructions executed by a processor (e.g., processor 110) and stored in a memory (e.g., memory 112). In a given implementation, processor 110 may represent multiple processors, and memory 112 may represent multiple memories. Processor 110 represents generally any instruction execution system, such as a computer/processor based system or an ASIC (Application Specific Integrated Circuit), a computer, or other system that can fetch or obtain instructions or logic stored in memory 112 and execute the instructions or logic contained therein. Memory 112 represents generally any memory configured to store program instructions and other data.

Figure 2:
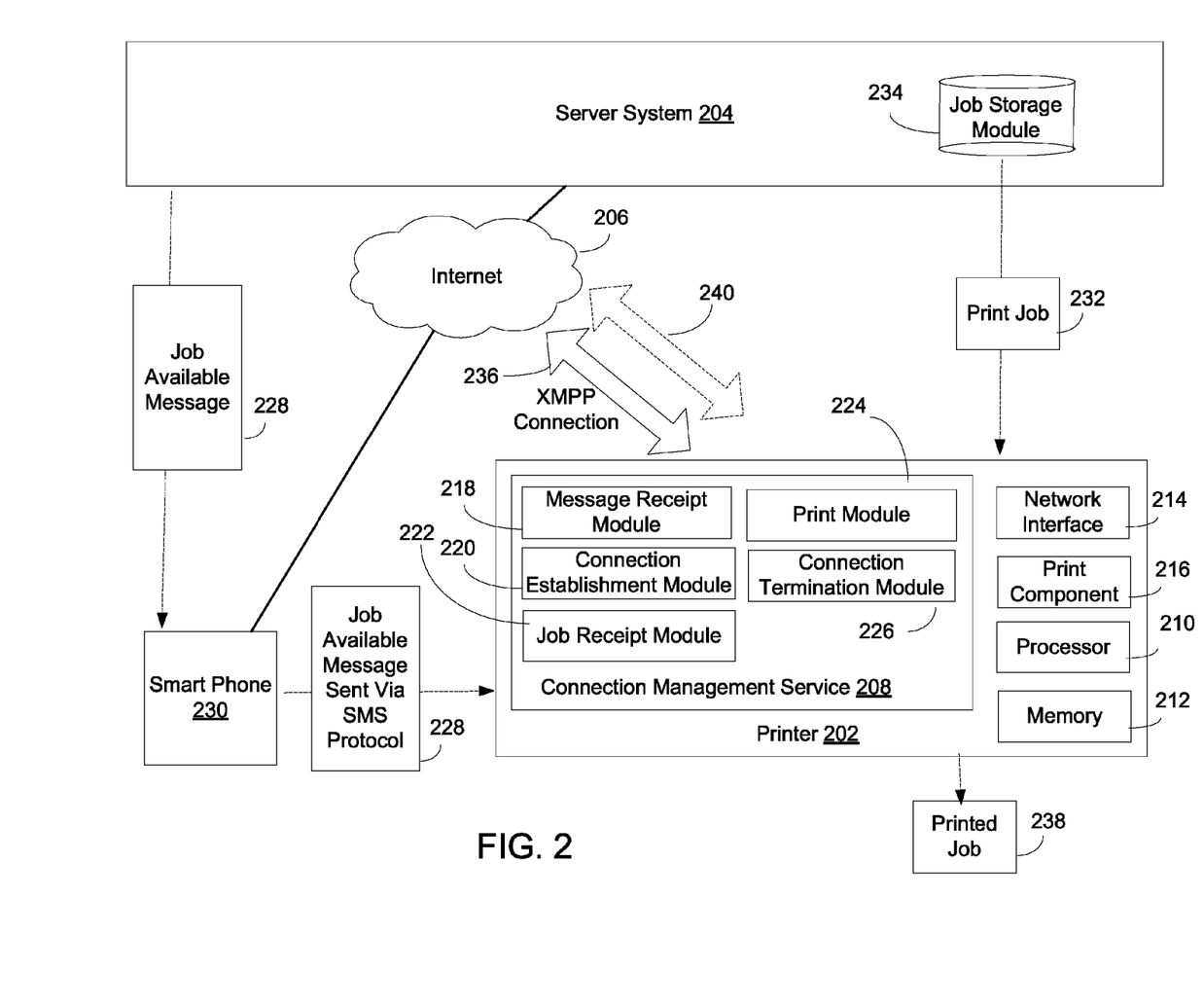

FIG. 2 is a block diagram that includes a network-connectable printer 202 according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 2 shows printer 202 and server system 204 connected to internet 206. Printer 202 is shown to include a network interface 214, print component 216, and a connection management service 208. Network interface 214 represents generally any combination of hardware and programming configured for electronically connecting printer 202 to the internet 206. Print component 216 represents generally any combination of hardware and programming configured to produce printed output.

Connection management service 208 represents generally any combination of hardware and programming configured to manage connections between printer 202 and network 206 in order that the printer will receive print jobs. Connection management service 208 includes a message receipt module 218, connection establishment module 220, job receipt module 222, print module 224, and connection termination module 226.

Message receipt module 218 receives a message 228 from smart phone computing system 230, via a SMS text messaging protocol. In this example, the message 228 instructs printer 202 that a print job 232 is available to be obtained from server system 204 via the internet 206. In this example, the job available message 228 was received at smart phone 230 from server system 204, which stores, at job storage module 234, print jobs to be distributed to internet connected printers.

Connection establishment module 220, in response to receipt of the job available message 228 via SMS, establishes a connection 236 between the printer 202 and the internet 206 via the XMPP communication protocol. In other examples, the connection may be a TCP based SIP protocol, or other communication protocol appropriate for transporting print jobs and operating communications between printer 202 and server system 204.

After the establishment of the XMPP connection 236, job receipt module 222 receives the print job 232 via the connection. After receipt of the print job 232, print module 224, in conjunction with print component 216, causes printing of the print job 232 at printer 202. In this example, immediately after printing of the job 238, connection termination module 226 terminates the XMPP connection 240. In other examples, the XMPP connection 240 is terminated after printer 202 prints the print job 238 and performs post-printing operations such as sending data relating to the printing of the job 238 to server system 204, and/or performing a calibration routine.

Smart phone 230 represents generally any mobile or portable computing device capable of communicating with printer 202. In this example, the job available message 228 is communicated by smart phone 230 via SMS protocol. In embodiments, the communication may be via a Bluetooth® connection, infrared connection, Wi-Fi™ connection, or a connection via another communication protocol that is distinct from the XMPP protocol used in establishing the connection 236.

The functions and operations described with respect to connection management service 208 and printer 202 may be implemented as a computer-readable storage medium containing instructions executed by a processor (e.g., processor 210) and stored in a memory (e.g., memory 212). In a given implementation, processor 210 may represent multiple processors, and memory 212 may represent multiple memories.

Figure 3:
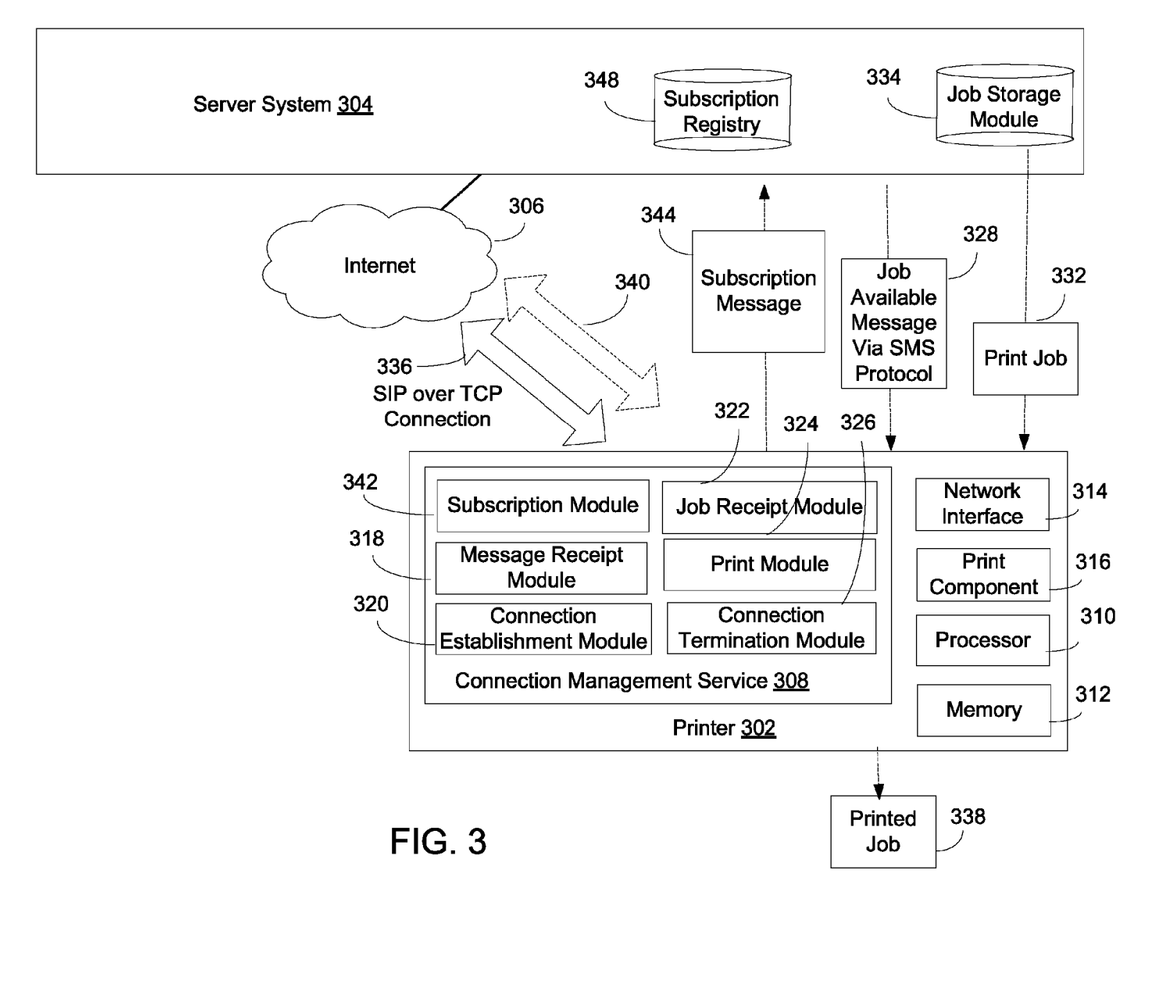

FIG. 3 is a block diagram illustrating a system according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 3 shows printer 302 and server system 304 connected to internet 306. Printer 302 is shown to include a network interface 314, print component 316, and a connection management service 308. Network interface 314 represents generally any combination of hardware and programming configured for electronically connecting printer 302 to the internet 306. Print component 316 represents generally any combination of hardware and programming configured to produce printed output.

Connection management service 308 represents generally any combination of hardware and programming configured to manage connections between printer 302 and internet 306 in order that the printer will receive print jobs via the internet. Connection management service 308 includes subscription module 342, message receipt module 318, connection establishment module 320, job receipt module 322, print module 324, and connection termination module 326.

Subscription module 342 sends a subscription message 344 to server system 304. The message 344 subscribes or registers internet-connectable printer 302 with a subscription registry 348 at server system 304. In an example, the subscription message 344 is sent as a result of a user or administrator instruction made at a touchpad or other user interface at printer 302. The subscription message 344 may be sent via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). In another embodiment, the subscription message may be sent to server system 304 as a result of a user or administrator instruction made at a computing device distinct from printer 302, e.g., a desktop computer, laptop computer, table computer, mobile computing device, or other computing system that is connected to internet 306. After registration, server system 304 sends a job available message 328 to internet-connectable printer 302 whenever there is a print job available at server system 334 for download and printing by printer 302.

Message receipt module 318 receives a message 328 from server system 304, via a SMS text messaging protocol. In this example, the message 328 instructs printer 302 that a print job 332 is available to be obtained from server system 304 via the internet 306.

Connection establishment module 320, in response to receipt of the job available message 328 from server system 304 via SMS protocol, establishes a connection 336 between the printer 302 and the internet 306 via SIP over a TCP communication protocol. In other examples, the connection may be a XMPP protocol, or other communication protocol appropriate for transporting print jobs and operating communications between printer 302 and server system 304.

After the establishment of the SIP over a TCP connection 336, job receipt module 322 receives the print job 332 via the connection. After receipt of the print job 332, print module 324 causes printing of the print job 332 at printer 302. In this example, connection termination module 326 terminates the SIP over a TCP connection 340 after printing of the job 338 and the communication of data relating to the print job to the server system 304.

The functions and operations described with respect to connection management service 308 and printer 302 may be implemented as a computer-readable storage medium containing instructions executed by a processor (e.g., processor 310) and stored in a memory (e.g., memory 312). In a given implementation, processor 310 may represent multiple processors, and memory 312 may represent multiple memories.

Figure 4:
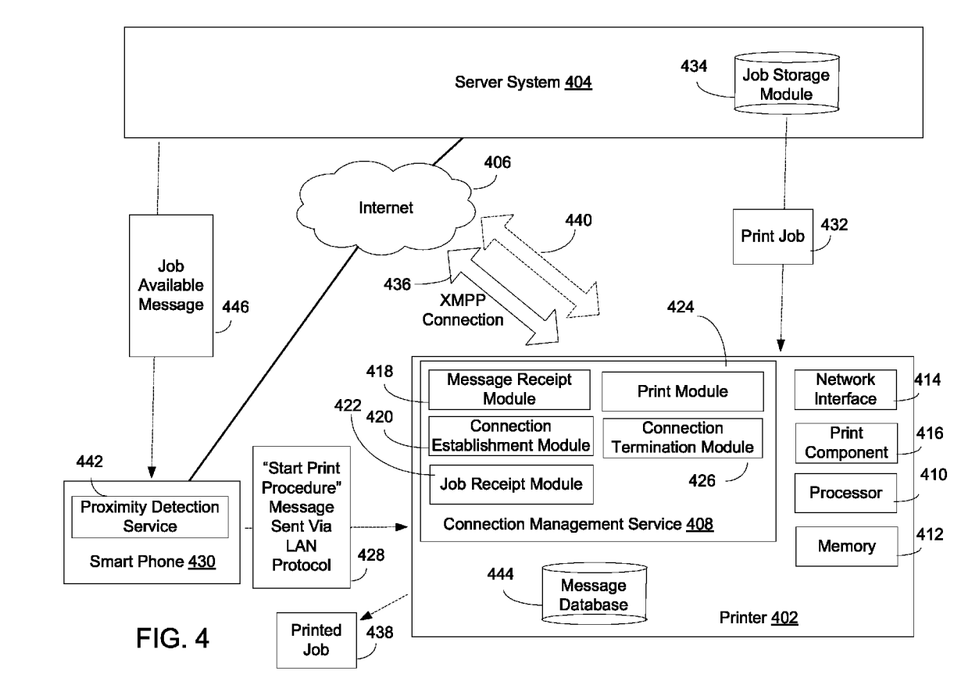

FIG. 4 is a block diagram that includes a network-connectable printer 402 according to various embodiments. FIG. 4 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 4 shows printer 402, server system 404, and smart phone 430 connected to internet 406. Printer 402 is shown to include a network interface 414, print component 416, and a connection management service 408. Network interface 414 represents generally any combination of hardware and programming configured for electronically connecting printer 402 to the internet 406. Print component 416 represents generally any combination of hardware and programming configured to produce printed output.

Connection management service 408 represents generally any combination of hardware and programming configured to manage connections between printer 408 and internet 406 in order that the printer will receive print jobs. Connection management service 408 includes a message receipt module 418, connection establishment module 420, job receipt module 422, print module 424, and connection termination module 426.

Message receipt module 418 receives a "start print procedure" message 428 from smart phone computing system 430, via a LAN protocol in response to the smart phone 430 detecting a proximity from the phone 430 to printer 402. In examples, the LAN protocol may be, but is not limited to, a Bluetooth®, Wi-Fi™, or infrared communication protocol. Smart phone 430 utilizes a proximity detection service 442 to detect the proximity. In an example, the proximity detection service 442 may detect the proximity by recognizing that the smart phone 430 and the printer 402 have connected via the Bluetooth®, Wi-Fi™, infrared or other connection with a known effective distance. Utilizing a known effective range for the applicable communication protocol, the service 442 can estimate the proximity between the smart phone 430 and the printer 402. For example, if the detection service has information that the range of Bluetooth® connection is less than or equal to thirty-two feet, and the service 442 detects a Bluetooth® connection, the service 442 may conclude that the smart phone 430 is within a proximity of less than or equal to thirty-two feet from the printer 402. Based on the assumption that the user of the smart phone is also within a thirty-two foot proximity to the printer 402, the smart phone 430 sends the "start print procedure" message 428 to printer 402. In another example, the proximity detection service 442 utilizes Global Positioning System ("GPS") programming, and sends the "start print procedure" message 428 to printer 402 upon detecting that smart phone 430 is within a certain proximity to the GPS coordinates of printer 402.

In this example, message 428 is a message to "start print procedure" and therefore does not explicitly instruct printer 402 to establish an XMPP connection with server system 404. The "start print procedure" was generated at the smartphone 430 in response to receipt of a job available message 446 at the smart phone 430 from server system 404.

Message receipt module 418 compares the received "start print procedure" message 428 to a database 444 of messages that are to be interpreted as instructions to establish the XMPP connection 436 and finds the "start print procedure" message in the database of accepted messages. Thus, the "start print procedure" message is interpreted as a message to establish the XMPP connection 436.

Connection establishment module 420, in response to receipt of the start print procedure message 428 via the LAN protocol, establishes a connection 436 between the printer 402 and the internet 406 via XMPP communication protocol. In other examples, the connection may be a TCP based SIP protocol, or other communication protocol appropriate for transporting print jobs and operating communications between printer 402 and server system 404.

After the establishment of the XMPP connection 436, job receipt module 422 receives the print job 432 from server system 404 via the connection. After receipt of the print job 432, print module 424 causes printing of the print job 432 at printer 402. After printing of the job 438, connection termination module 426 terminates the XMPP connection 440.

Smart phone 430 represents generally any mobile or portable computing device capable of communicating with printer 402. In this example, the start print procedure message 428 is communicated by smart phone 430 via a LAN protocol. In other embodiments, the communication may be via a Bluetooth®, Wi-Fi™, infrared or other communication protocol that is distinct from the XMPP protocol used in establishing the connection 436.

The functions and operations described with respect to connection management service 408 and printer 402 may be implemented as a computer-readable storage medium containing instructions executed by a processor (e.g., processor 410) and stored in a memory (e.g., memory 412). In a given implementation, processor 410 may represent multiple processors, and memory 412 may represent multiple memories.

Figure 5:
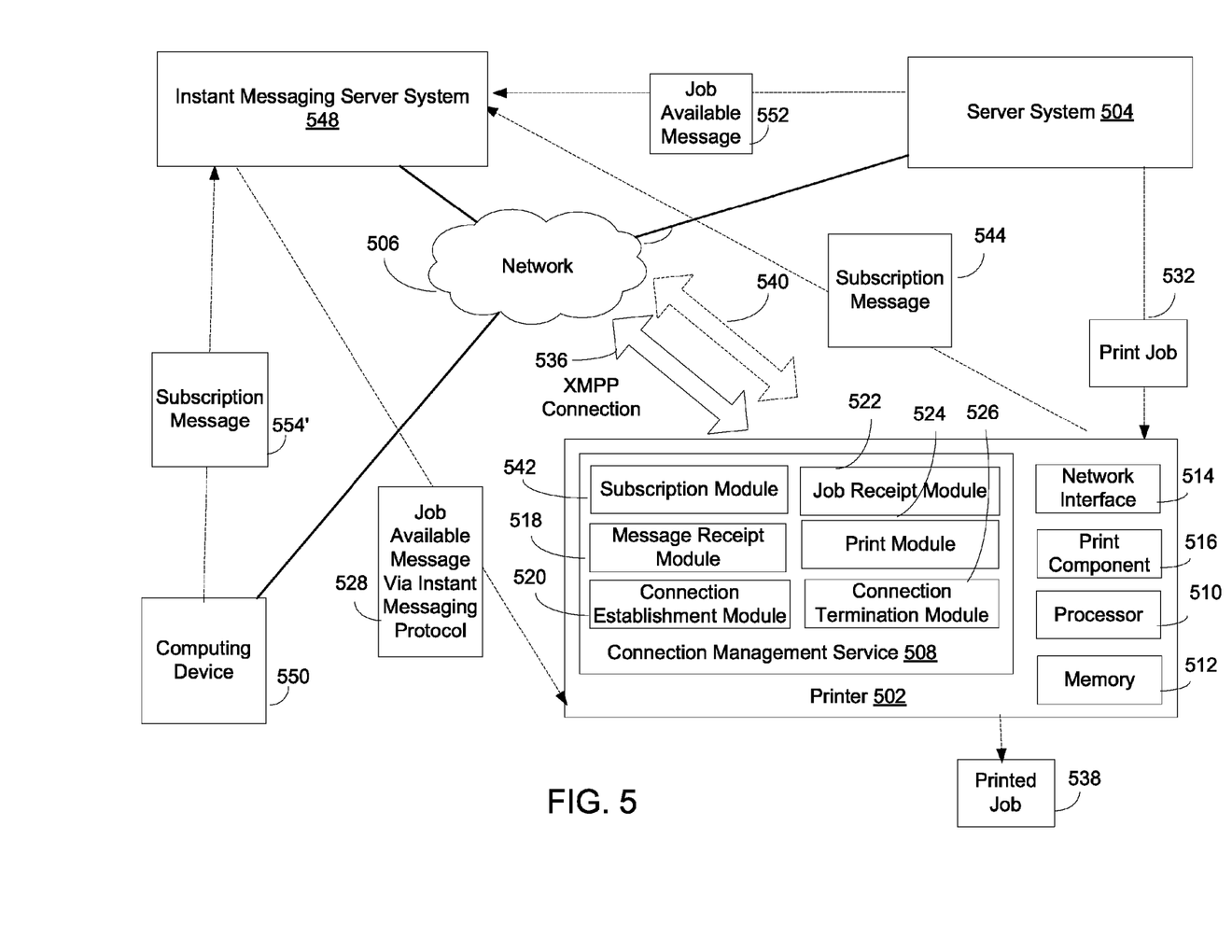

FIG. 5 is a block diagram illustrating a system according to various embodiments. FIG. 5 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 5 shows printer 502, server system 504, instant messaging (sometimes hereinafter referred to as "IM") server system 548, and computing device 550 connected to network 506. Printer 502 is shown to include a network interface 514, print component 516, and a connection management service 508. Network interface 514 represents generally any combination of hardware and programming configured for electronically connecting printer 502 to the network 506. Print component 516 represents generally any combination of hardware and programming configured to produce printed output.

Connection management service 508 represents generally any combination of hardware and programming configured to manage connections between printer 502 and network 506 in order that the printer will receive print jobs via the network 506 in a manner that conserves bandwidth and power, and reduces security threats to the system. Connection management service 508 includes subscription module 542, message receipt module 518, connection establishment module 520, job receipt module 522, print module 524, and connection termination module 526.

Subscription module 542 sends a subscription message 544 to IM server system 548. The message 544 subscribes or registers network-connectable printer 502 with IM server system 548 such that IM server system 548 sends a job available message 528 to network-connectable printer 502 whenever the IM Server system receives a message 552 from server system 504 that there is a print job available for download and printing by printer 502. The job available message received at IM server system 548 from server system 504 may be received via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). Message receipt module 518 receives a message 528 from IM Server System 548, via an instant messaging. In this example, the message 528 instructs printer 502 that a print job 532 is available to be obtained from server system 504 via the network 506.

Connection establishment module 520, in response to receipt of the job available message 528 from IM server system 548 via an instant message, establishes a connection 536 between the printer 502 and the network 506 via XMPP communication protocol. In other examples, the connection may be a SIP over a TCP protocol, or other communication protocol appropriate for transporting print jobs and operating communications between printer 502 and server system 504.

After the establishment of the XMPP connection 536, job receipt module 522 receives the print job 532 via the connection. After receipt of the print job 532, print module 524 causes printing of the print job 532 at printer 502. After printing of the job 538, connection termination module 526 terminates the XMPP connection 540.

IM server system 548 represents generally any computing device or system of computing devices configured to communicate with printer 502 and server system 504 via the network 506. In this example, IM server system 548 sends the job available message 528 to printer 502 via the instant messaging protocol as a result receipt of subscription message 544 or 544', and receipt of job available message 552 from server system 504.

The functions and operations described with respect to connection management service 508 and printer 502 may be implemented as a computer-readable storage medium containing instructions executed by a processor (e.g., processor 510) and stored in a memory (e.g., memory 512). In a given implementation, processor 510 may represent multiple processors, and memory 512 may represent multiple memories.

Figure 6:
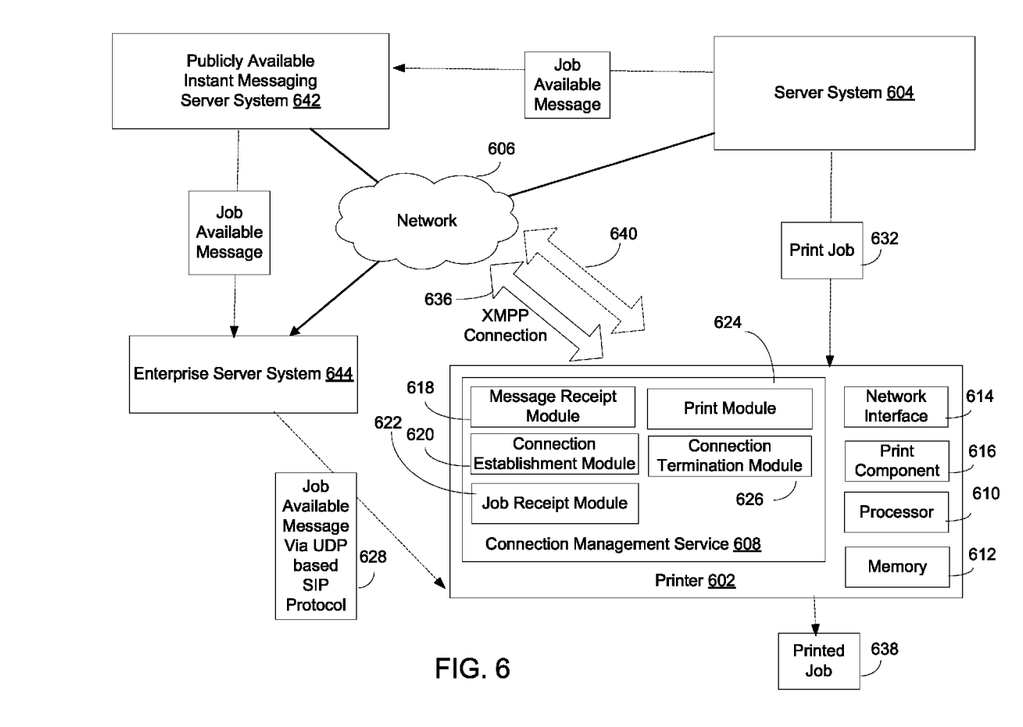

FIG. 6 is a block diagram that includes an enterprise network-connectable printer 602 according to various embodiments. FIG. 6 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 6 shows printer 602, server system 604, a publicly available IM server system 642 (hereinafter "PAIM server system"), and an enterprise server system 644 connected to a network 606. Server system 604 represents generally any device or system of computing devices configured to process print jobs and send print jobs to network-connectable printers such as printer 602 via the network 606. The PAIM server system 642 represents generally any device or system of computing devices configured to provide an IM service to computing devices via the internet. Examples of PAIM server system are Yahoo® Messenger and Google® Talk, and IM services provided by telecommunications companies. Enterprise server system 644 represents generally any device or system of computing devices configured to receive a message from a PAIM server system via network 606, and send a message to printer 602 via network 606 in response to receipt of the message from the PAIM server system.

In an example, server system 604 sends to the PAIM server system 642 via network 606 a message that a print job is available at server system 604 for retrieval by printer 602. Pursuant to a subscription arrangement between PAIM server system 642 and enterprise server system 644, the PAIM server system 642 sends a message to the enterprise server system 644 via network 606. The message indicates that a print job is available at server system 604 for retrieval by printer 602. Responsive to receipt of the message from the PAIM server system, the enterprise server system 644 sends a job-available message 628 to the printer 602. In an embodiment, the messages sent by the server system 604, the PAIM server system 642, and the enterprise server system 644 are a same message. In another embodiment, the messages sent by the server system 604, the PAIM server system 642, and the enterprise server system 644 are not same message.

Printer 602 is shown to include a network interface 614, print component 616, and a connection management service 608. Network interface 614 represents generally any combination of hardware and programming configured for electronically connecting printer 602 to the enterprise network 606. Print component 616 represents generally any combination of hardware and programming configured to produce printed output. Connection management service 608 represents generally any combination of hardware and programming configured to manage connections between printer 602 and network 606 in order that the printer can receive print jobs. Connection management service 608 includes a message receipt module 618, connection establishment module 620, job receipt module 622, print module 624, and connection termination module 626.

Message receipt module 618 receives a message 628 from enterprise server system 644 over the network 606, via a User Datagram Protocol ("UDP") based SIP protocol. In this example, the message 628 instructs printer 602 that a print job 632 is available to be obtained via the network 606.

Connection establishment module 620, in response to receipt of the job available message 628 via the UDP based SIP protocol, establishes a connection 636 between the printer 602 and the enterprise network 606 via XMPP communication protocol. In other examples, the connection may be a TCP based SIP protocol, or other communication protocol appropriate for transporting print jobs and operating communications between printer 602 and server system 604.

After the establishment of the XMPP connection 636, job receipt module 622 receives the print job 632 via the connection. After receipt of the print job 632, print module 624 causes printing of the print job 632 at printer 602. After printing of the job 638, connection termination module 626 terminates the XMPP connection 640.

The functions and operations described with respect to connection management service 608 and printer 602 may be implemented as a computer-readable storage medium containing instructions executed by a processor (e.g., processor 610) and stored in a memory (e.g., memory 612). In a given implementation, processor 610 may represent multiple processors, and memory 612 may represent multiple memories.

Figure 7:
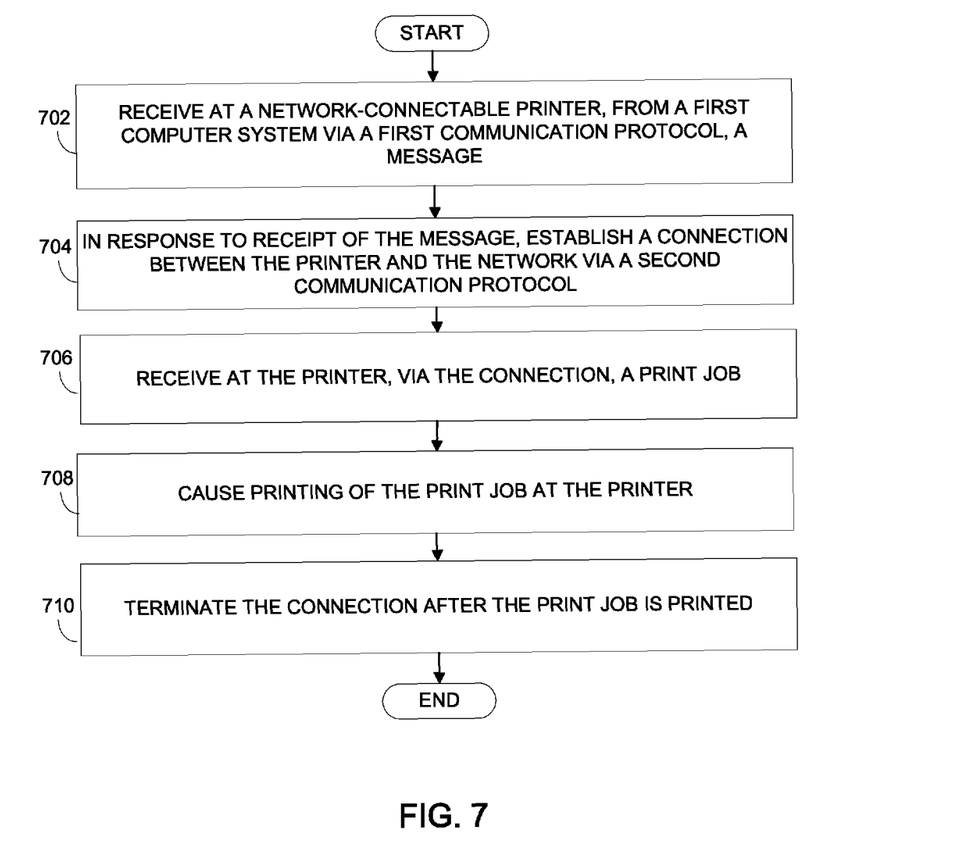
FIG. 7 is a flow diagram depicting steps taken to implement various embodiments.

FIG. 7 is a flow diagram of operation in a system according to various embodiments. In discussing FIG. 7, reference may be made to the diagram of FIGS. 2-6 to provide contextual examples. Implementation, however, is not limited to those examples. Starting with FIG. 7, a network-connectable printer receives a message via a first communication protocol from a first computer system (block 702). Referring back to FIGS. 2-6, message receipt module 218, 318, 418, 518, or 618 may be responsible for implementing block 702.

Continuing with the flow diagram of FIG. 7, in response to receipt of the message, a connection is established between the printer and the network via a second communication protocol (block 704). Referring back to FIGS. 2-6, message receipt module 220, 320, 420, 520, or 620 may be responsible for implementing block 704.

Continuing with the flow diagram of FIG. 7, the printer receives a print job via the connection (block 706). Referring back to FIGS. 2-6, job receipt module 222, 322, 422, 522, or 622 may be responsible for implementing block 706.

Continuing with the flow diagram of FIG. 7, printing of the print job is caused to occur at the printer (block 708). Referring back to FIGS. 2-6, print module 224, 324, 424, 524, or 624 may be responsible for implementing block 708.

Continuing with the flow diagram of FIG. 7, the connection between the printer and the first computer system is terminated after the print job is printed (block 710). Referring back to FIGS. 2-6, connection termination module 226, 326, 426, 526, or 626 may be responsible for implementing block 710.

Although the flow diagram of FIG. 7 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations and examples herein should be construed in an illustrative, and not a restrictive, sense.

What is claimed is:

1. A remote server to manage network connections for a plurality of network connectable printers, the remote server comprising:
   at least one processor; and
   at least one memory resource storing instructions that, when executed by the at least one processor, cause the remote server to:
      send, via a first communication protocol, a job available message to a network connectable printer, the job available message indicating to the network connectable printer that a print job is available at the remote server, wherein the job availability message causes the network connectable printer to establish a network connection via a second communication protocol with the remote server; and
      send the print job to the network connectable printer via the second communication protocol.

2. The remote server of claim 1, wherein the instructions, when executed by the at least one processor, further cause the remote server to:
   receive a subscription message to register the network connectable printer; and
   register the network-connectable printer in a subscription registry of the remote server.

3. The remote server of claim 2, wherein the subscription message is received via the first communication protocol.

4. The remote server of claim 2, wherein the subscription message is received via the second communication protocol.

5. The remote server of claim 1, wherein the first communication protocol comprises a Short Message Service (SMS) protocol.

6. The remote server of claim 1, wherein the second communication protocol comprises at least one of a Transmission Control Protocol/Internet Protocol (TCP/IP), a HyperText Transfer Protocol (HTTP), a Simple Mail Transfer Protocol (SMTP), an Extensible Messaging and Presence Protocol (XMPP), or a Session Initiated Protocol (SIP).

7. The remote server of claim 1, wherein the job availability message causes the network connectable printer to establish an Internet connection to receive the print job.

8. A network connectable printer comprising:
   a processor; and
   a memory storing instructions that, when executed by the processor, cause the network connectable printer to:
      send a subscription message to an instant messaging server to register the network connectable printer with the instant messaging server;
      receive a message, wherein the message is received from the instant messaging server based on a job availability message being sent from the remote server to the instant messaging system;
      based on receiving the message, establish a network connection to retrieve a print job from a remote server;
      print the print job; and
      in response to printing the print job, terminate the network connection.

9. The network connectable printer of claim 8, wherein the message is received via a text messaging protocol.

10. The network connectable printer of claim 8, wherein the message indicates that the print job is available at the remote server.

11. The network connectable printer of blain 8, wherein the message is received from an enterprise system.

12. The network connectable printer of claim 11, wherein the enterprise system comprises a subscription arrangement with a publicly available instant messaging (PRIM) system, and wherein the message is received from the enterprise system based on a job availability message being sent from the remote server to the PRIM system.

13. The network connectable printer of claim 8, wherein the message is received via a local area network (LAN) protocol.

14. The network connectable printer of claim 13, wherein the LAN protocol comprises one of a Bluetooth a Wi-Fi, or an infrared communication protocol.

15. The network connectable printer of claim 13, wherein the message is received via the LAN protocol by a smart phone implementing a proximity detection service.

16. The network connectable printer of claim 15, further comprising:
a global positioning system (GPS) resource to provide GPS coordinates of the network connectable printer to the smart phone.

17. The network connectable printer of claim 8, wherein the instructions, when executed by the processor, further cause the network connectable printer to:
in response to receiving the message, compare the message with stored messages in a message database of the network connectable printer to identify a matching start procedure message;
wherein establishing the network connection is based on instructions of the matching start procedure message.

18. A non-transitory computer readable medium storing instructions that, when executed by a processor of a network connectable printer, cause the network connectable printer to:
send a subscription message to an instant messaging server o register the network connectable printer with the instant messaging server;
receive a message, wherein the message is received from the instant messaging server based on a job availability message being sent from the remote server to the instant messaging system;
based on receiving the message, establish a network connection to retrieve a print job from a remote server;
print the print job; and
in response to printing the print job, terminate the network connection.

* * * * *